United States Patent
Yamamoto et al.

(10) Patent No.: US 6,881,504 B2
(45) Date of Patent: Apr. 19, 2005

(54) PERPENDICULAR MAGNETIC RECORDING MEDIUM AND MAGNETIC STORAGE APPARATUS USING THE SAME

(75) Inventors: Tomoo Yamamoto, Hachioji (JP); Ichiro Tamai, Hachioji (JP); Akira Ishikawa, Kokubunji (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 0 days.

(21) Appl. No.: 10/650,809

(22) Filed: Aug. 29, 2003

(65) Prior Publication Data

US 2004/0043258 A1 Mar. 4, 2004

Related U.S. Application Data

(63) Continuation of application No. 09/941,735, filed on Aug. 30, 2001, now Pat. No. 6,638,648.

(30) Foreign Application Priority Data

Sep. 28, 2000 (JP) ........................................ 2000-296764

(51) Int. Cl.[7] .............................. G11B 5/66; G11B 5/70
(52) U.S. Cl. ........................ 428/694 TS; 428/694 TM; 428/336; 428/611; 428/900
(58) Field of Search .................... 428/694 TS, 694 TM, 428/336, 900, 611

(56) References Cited

U.S. PATENT DOCUMENTS

| | | | |
|---|---|---|---|
| 6,248,419 B1 | 6/2001 | Lambeth et al. | ........... 428/65.3 |
| 6,562,489 B1 * | 5/2003 | Abarra et al. | .......... 428/694 TS |
| 2001/0033949 A1 | 10/2001 | Abarra et al. | .......... 428/694 TS |

FOREIGN PATENT DOCUMENTS

| | | |
|---|---|---|
| JP | 06-076260 | 8/1992 |
| JP | 7-334832 | 6/1994 |
| JP | 8-129738 | 11/1994 |
| JP | 2000-099934 | 9/1998 |
| JP | 2001-143250 | 11/1999 |

OTHER PUBLICATIONS

Machine translation of JP 2000–099934, Akimoto et al., published Apr. 2000.

Y. Hirayama, K. Ito, Y. Honda, N. Inaba, M. Futamoto, "Thermal Stability of CoCr-alloy Perpendicular Magnetic Recording Media", Jornal of Magnetism and Magnetic Materials 193 (1999) pp. 253–257.

A. Sato, S. Nagagawa and M. Naoe, "Optimization of the Substrate Temperature for a Paramagnetic Seed Layer in a Co–Cr Perpendicular Recording Medium", Dept. of Physical Electronics, Tokyo Institute of Technology, (Oct. 27, 1999 and Jan. 25, 2000), vol. 24, No. 4–2, pp. 267–270.

* cited by examiner

Primary Examiner—Holly Rickman
(74) Attorney, Agent, or Firm—Reed Smith LLP; Stanley P. Fisher, Esq.; Juan Carlos A. Marquez, Esq.

(57) ABSTRACT

A large-capacity magnetic storage apparatus is disclosed, capable of performing ultra-high density magnetic recording of 50 gigabits or more per 1 square inch. In a perpendicular magnetic recording medium having a non-magnetic intermediate layer and a magnetic recording layer sequentially formed, the non-magnetic intermediate layer is composed of a layer having a face-centered cubic structure and containing a non-magnetic elements excluding Pt. Specifically, the intermediate layer mainly contains at least one selected from the group of elements constituted of Al, Cu, Rh, Pd, Ag, Ir and Au, and is composed of a film having a face-centered cubic (f. c. c.) structure. The magnetic recording layer contains at least Co, Cr and Pt, and is composed of a film having a hexagonal close-packed (h. c. p.) structure. More preferably, a non-magnetic h. c. p. intermediate layer is provided between the non-magnetic intermediate layer and the magnetic recording layer.

16 Claims, 9 Drawing Sheets

DISTANCE BETWEEN NEAREST NEIGHBOR ATOMS

DISTANCE BETWEEN NEAREST NEIGHBOR ATOMS IN h.c.p. STRUCTURE $\frac{\sqrt{2}}{2} a_{fcc}$ ⇒ DISTANCE BETWEEN NEAREST NEIGHBOR ATOMS IN f.c.c. STRUCTURE

PERPENDICULAR MAGNETIC RECORDING MEDIUM AND MAGNETIC STORAGE APPARATUS USING THE SAME

This application is a Continuation of nonprovisional application Ser. No. 09/941,735 filed Aug. 30, 2001 now U.S. Pat. No. 6,638,648. Priority is claimed based on U.S. application Ser. No. 09/941,735 filed Aug. 30, 2001, now U.S. Pat. No. 6,638,648, which claims the priority of Japanese application 2000-296764 filed on Sep. 28, 2000.

BACKGROUND OF THE INVENTION

1. Field of the Invention

The present invention relates to a magnetic recording medium such as magnetic recording drums, magnetic recording tapes, magnetic recording disks, magnetic recording cards, and so on, and a magnetic storage apparatus. More particularly, the invention relates to a perpendicular magnetic recording medium suitable for ultra-high density magnetic recording of 50 gigabits or more per 1 square inch, and a magnetic storage apparatus using the same.

2. Description of the Related Art

With the popularized use of the Internet in recent years, there have been increases not only in the shipping number of personal computers, but also in the demand for a magnetic recording disk device. Connection to the Internet can be made not only by a personal computer but also by a portable terminal. However, to make the portable terminal itself more convenient, it is essential to incorporate the magnetic recording disk device, and the demand in this field is also expected to grow in the future. In addition, as digital television broadcasting is near at hand, the use of the magnetic recording disk device as a video recorder has begun on a full scale. Accordingly, the application field of the magnetic recording disk device has been increasingly expanded. Still, however, further miniaturization and a larger capacity have been requested by users.

The magnetic recording disk device thus far available has employed an in-plane recording system. In in-plane recording, the recording direction of magnetization is in-plane, and adjacent magnetization is reverse in polarity. Thus, between adjacent recording bits, a magnetization transition region is formed in order to reduce magnetostatic energy. A large width of the magnetization transition region causes an increase in noise and, thus, to reduce noise, thin formation of a magnetic layer and micronization of the magnetic crystal grain size are considered to be effective. Therefore, an approach to the high recording density of an in-plane recording medium is to focus on how to reduce the volume of a very small magnet constituting a recording bit. It is generally considered, however, that it will be difficult to deal with a much higher recording density expected in the future, with the in-plane recording medium, because of a physical limitation. In other words, the in-plane recording medium may have a problem in basic performance for saving recording information, due to the thermal fluctuation phenomenon of magnetization following the micronization of the very small magnet constituting the recording bit.

For the foregoing reason, a perpendicular magnetic recording medium has again attracted attention recently. In perpendicular recording, the direction of recorded magnetization is perpendicular to a film plane, and no strong charge is present between adjacent recording bits, preventing the width of a magnetization transition region from becoming as large as that of the in-plane medium. Thus, with a much higher density of the magnetic recording disk device in mind, high expectation is now placed on the potential of a perpendicular magnetic recording system.

With regard to the perpendicular magnetic recording medium, there are largely two, i.e., a single-layered perpendicular medium and a double-layered perpendicular medium. The double-layered perpendicular medium includes a soft magnetic layer between a magnetic layer and a substrate for saving information, and the presence of this soft magnetic layer is a main difference from the single-layered perpendicular medium. Each medium has advantages and disadvantages. At present, however, the combined system of the double-layered perpendicular medium with a single magnetic pole head is most promising.

As a practical problem, also in the perpendicular magnetic recording medium, there is a problem of a reduction in read output, caused by the thermal fluctuation of magnetization. To solve this problem, it is important to enhance perpendicular orientation of an easy magnetization axis (c axis) regarding the magnetic layer mainly containing Co having a hexagonal close-packed structure (h. c. p.).

With regard to the conventional perpendicular medium, a technology has been proposed to provide a non-magnetic underlayer having an h. c. p. structure between the substrate and the magnetic layer, to enhance perpendicular orientation. An example is a TiCr underlayer (Journal of Magnetism and Magnetic Materials, 193, pp. 253–257 (1999)). A main element of the TiCr underlayer is Ti, obtained by adding 20 at. % or lower of Cr. A crystal is grown in such a way as to set the c axis of the underlayer perpendicular to the film surface, and by growing a magnetic layer thereon in a heteroepitaxial manner, the perpendicular orientation of the easy magnetization axis of the magnetic layer can be enhanced. Other than the non-magnetic h. c. p. underlayer, a technology for providing an underlayer containing Pt has been proposed (Journal of Magnetics Society of Japan, 24, pp. 267–270 (2000)).

To counter the thermal fluctuation of the perpendicular magnetic recording medium, it is important not only to enhance the perpendicular orientation of the axis of the easy magnetization, but also to increase squareness at least to 0.9 or more simultaneously. There are two methods of obtaining squareness, i.e., one by VSM measurement based on Mr/Ms in M-H loop, and the other by Kerr effect measurement. Regarding the foregoing TiCr underlayer, one satisfactory to a certain level in terms of perpendicular orientation can be obtained. Because of small squareness, however, the influence of thermal fluctuation is large, causing a reduction in read output. On the other hand, regarding the Pt underlayer, there is a difference in size from the crystal lattice of the magnetic layer though (111) orientation of the Pt underlayer is strong. Consequently, lattice matching is bad, making it difficult to improve perpendicular orientation as expected.

Further, to achieve a high recording density for the perpendicular magnetic recording medium, a reduction in medium noise becomes an important technical subject. An effective way of achieving low noise is to reduce the crystal grain size of the magnetic layer. Because of the heteroepitaxial growth of the magnetic layer on the underlayer, to micronize the crystal grain size of the magnetic layer, needless to say, the micronization of the gain size of the underlayer becomes an important technical subject.

Compared with the conventional medium, the medium of the present invention has a complex layer structure. Thus, the underlayer that has been described will be referred to as a non-magnetic intermediate layer hereinafter for convenience.

SUMMARY OF THE INVENTION

A first object of the invention is to provide a perpendicular magnetic recording medium having low noise and thermal stability by developing a non-magnetic intermediate layer capable of enhancing the perpendicular orientation of an easy magnetization axis with respect to a film surface, and simultaneously micronizing a magnetic crystal grain.

A second object of the invention is to provide a magnetic storage apparatus having a recording density of 50 gigabits or more per 1 square inch, by making sufficient use of performance of the above magnetic recording medium.

The first object of the invention is achieved by a perpendicular magnetic recording medium, comprising a non-magnetic intermediate layer, and a magnetic recording layer, which are sequentially formed. In this case, the non-magnetic intermediate layer has a face-centered cubic structure, and contains non-magnetic elements excluding Pt. Specifically, the intermediate layer is composed of a film mainly containing one selected from the group of elements constituted of Al, Cu, Rh, Pd, Ag, Ir and Au, and having a face-centered cubic (f. c. c.) structure. The magnetic recording layer is composed of a film containing at least Co, Cr and Pt, and having a hexagonal close-packed (h. c. p.) structure.

In the case of the film having the f. c. c. structure, if [111] is grown perpendicularly to a film surface, then (111) is grown within the film surface. On the other hand, in the case of the film having the h. c. p. structure, if [0001] is grown perpendicularly to a film surface, then (00.1) is grown within the film surface. As shown in FIG. 2, the atom arrays of the f. c. c. structure (111) and the h. c. p. structure (00.1) exhibit the same closest packing surfaces. When the process of each film crystal growth is closely observed atomic layer by layer, there is no difference between the f. c. c. structure and the h. c. p. structure from a first atomic layer (A surface) to a second atomic layer (B surface) grown thereon. On a third atomic surface grown on the second atomic layer, for the h. c. p. structure, atoms of the third atomic layer are arrayed to overlap those of the first atomic layer in the same position. In other words, as the array of atomic surfaces perpendicular to the h. c. p. [0001] direction, an A surface, a B surface, an A surface, a B surface, . . . , are repeated. On the other hand, the third atomic layer of the f c. c. structure has a new array surface not overlapping the atom positions of the first atomic layer and the second atomic layer (C surface). A fourth atomic layer laminated on the third atomic layer has an atom array surface similar to that of the first atomic layer. Thus, as the array of atomic surfaces perpendicular to the f. c. c. [111] direction, an A surface, a B surface, a C surface, an A surface, a B surface, a C surface, . . . . , are repeated. Apparently, only the foregoing difference is present between the h. c. p. structure having [0001] oriented perpendicularly to the film surface, and the f. c. c. structure having [111] oriented. By taking out only an optional layer, atom array surfaces having the same closest packing structures are formed.

Therefore, since the f. c. c. (111) and the h. c. p. (00.1) have the same closest packing surfaces, the h. c. p. (00.1) may be grown on the f. c. c. (111) in a heteroepitaxial manner. As elements having f. c. c, structures, there are Al, Cu, Rh, Pd, Ag, Ir, Pt and Au. If these elements are (111) oriented, then an easy magnetization axis of the magnetic recording layer can be oriented perpendicularly. If a film having an f. c. c. structure is formed by sputtering and the like, generally a closest packing surface is oriented in-plane. In other words, since (111) orientation is easily obtained, perpendicular orientation of the magnetic recording layer is also easily obtained.

Lattice matching between (111) of Al, Cu, Rh, Pd, Ag, Ir, Pt and Au and (00.1) of Co depends on a distance between nearest neighbor atoms. The distance between the nearest neighbor atoms is, as shown in FIG. 3, a distance between the center positions of the neighbor atoms. To strengthen orientation for setting (00.1) of the magnetic recording layer having the h. c. p. structure parallel to the film surface, it is important to discover an intermediate layer having an f. c. c. structure close to a distance between the nearest neighbor atoms of Co. Distances between the nearest neighbor atoms in the h. c. p. and f c. c. structures are respectively set, as shown in FIG. 4, equal to a axial lengths (h. c. p.), and √2·a/2(f. c. c.). Table 1 shows √2·a/2 of an element having an f. c. c. structure, in which √2·a/2 of Cu takes a value 0.2556 nm, closest to an a axis (0.2506 nm) of Co. In an actual magnetic layer, one obtained by adding an element, e.g., Pt, to Co, is generally used. In this case, since a distance of the magnetic layer between nearest neighbor atoms is extended, the distance substantially coincides with that between the nearest neighbor atoms of Cu. Thus, among Al, Cu, Rh, Pd, Ag, Ir, Pt and Au, Cu is most preferable for enhancing orientation of the magnetic recording layer.

TABLE 1

| Element | a axial length [nm] | √2 · a/2 [nm] | Melting point [° C.] |
|---|---|---|---|
| Al | 0.4051 | 0.2864 | 660 |
| Cu | 0.3615 | 0.2556 | 1085 |
| Rh | 0.3803 | 0.2689 | 1960 |
| Pd | 0.3890 | 0.2751 | 1552 |
| Ag | 0.4086 | 0.2889 | 961 |
| Ir | 0.3839 | 0.2715 | 2443 |
| Pt | 0.3923 | 0.2774 | 1769 |
| Au | 0.4078 | 0.2884 | 1063 |

$a_{Co}$ = 0.2506 [nm]

On the other hand, among Al, Cu, Rh, Pd, Ag, Ir, Pt and Au, Pt is not preferable because of its low compatibility with the soft magnetic layer. According to the examination of the inventors, it was verified that providing a non-magnetic intermediate layer having an f. c. c. structure, adjacently to the soft magnetic layer was important for enhancing orientation of the magnetic recording layer. Generally, the soft magnetic layer contains Co or Fe. It may be necessary to subject the medium to heat treatment in order to perform magnetic domain control for the soft magnetic layer. In this case, diffusion occurs in an interface between the soft magnetic layer and the Pt non-magnetic intermediate layer, generating high coercivity in the surface layer of the soft magnetic layer. This may be attributed to the formation of the same structure as Co-Pt or Fe-Pt, well known as a permanent magnet material, in the interface. Even if no heat treatment is necessary for magnetic domain control of the soft magnetic layer, the formation of a Pt non-magnetic intermediate layer by sputtering causes mixing in the interface with the soft magnetic layer depending on energy of sputtering particles, which may generate high coercivity. The high coercivity of the soft magnetic layer is not preferable, because it increases medium noise. Further, the same phenomenon occurs when no soft magnetic layer is provided. On the non-magnetic intermediate layer having the f. c. c. structure, a non-magnetic h. c. p. intermediate layer, or a magnetic recording layer is directly formed, and Co is contained in any of the layers. Thus, diffusion occurs in the interface between Co contained in these layers and the Pt intermediate layer, causing various problems. As can be understood from the foregoing, Pt must be excluded though it has an f. c. c. structure, and it is important to select elements constituting the non-magnetic intermediate layer among Al, Cu, Rh, Pd, Ag, Ir and Au.

Depending on the kind of an element added to the magnetic recording layer, a distance between the nearest neighbor atoms of the magnetic recording layer may become extremely large. In such a case, it is necessary to select an element for the non-magnetic intermediate layer having the corresponding lattice size. In addition, rather than selecting an element only from the foregoing crystallographic viewpoint, it is important to select at least one from the group constituted of Al, Cu, Rh, Pd, Ag, Ir and Au from the viewpoint of chemical stability. A plurality of these elements may be selected, and alloyed. In such a case, the alloy must have an f. c. c. crystal structure.

The inventors examined the micronization of the crystal grain size for the Cu non-magnetic intermediate layer. For controlling the crystal grain size of a film formed by sputtering, a melting point of an element constituting the film is an important factor. As shown in Table 1, a Cu melting point is 1085° C., which is not so high. Generally, in the case of a low melting point, because of high mobility after the sticking of sputtering particles to the substrate, the crystal grain size tends to be increased. The increase of the grain size in turn causes an increase in medium noise, and thus the crystal grain must be micronized to a certain extent. To micronize the crystal grain size of the Cu non-magnetic intermediate layer, preferably, at least one element selected from V, Cr, Nb, Mo, Ta and W should be added by an amount set in the range from 0.5 at. % to 30 at. %.

The melting points of V, Cr, Nb, Mo, Ta and W are respectively 1905° C., 1875° C., 2468° C., 2615° C., 2998° C., and 3380° C., which are all high compared with that of Cu. By adding these elements of relatively higher melting points by amounts set in the range from 0.5 at. % to 30 at. %, the increase of the Cu crystal grain size can be prevented. In addition, all of these added elements have body-centered cubic (b. c. c.) structures as single bodies, and each is a eutectic type when a binary alloy phase diagram with Cu is examined. Generally, the addition of an element as a two-phase separation system is advantageous for micronizing the crystal grain size, and may also be advantageous for micronization from the viewpoint of a phase diagram.

There is no limitation placed on a material for the soft magnetic layer of the medium of the invention. A principal point of the invention is to control the crystal orientation of the magnetic recording layer by providing the foregoing non-magnetic intermediate layer of Cu or the like on the soft magnetic layer, and this effect will not be varied by the material of the soft magnetic layer. In the examination of the invention, the soft magnetic layers of FeNi, CoTaZr, FeTaC, and so on, were used, and there was no variation in the effect of the non-magnetic intermediate layer of Cu or the like for the enhancement of the crystal orientation of the magnetic recording layer.

Japanese Patent Application Laid-Open Hei 6 (1994)-76260 discloses a technology, which uses a Cu non-magnetic intermediate layer. In this conventional art, a soft magnetic layer is provided between the Cu intermediate layer and a magnetic recording layer. The invention is largely different from the conventional art in that the soft magnetic layer is provided between the substrate and the Cu intermediate layer. According to the examination by the inventors, it was discovered that the direct lamination of the magnetic recording layer on the soft magnetic layer caused magnetic coupling between the two layers, consequently reducing the coercivity of the magnetic recording layer.

Thus, the inventors concluded that it was important to provide a non-magnetic intermediate layer between the soft magnetic layer and the magnetic recording layer. In other words, the Cu non-magnetic intermediate layer has a function of controlling the crystal orientation of the magnetic recording layer, and an additional function of cutting off magnetic coupling between the soft magnetic layer and the magnetic recording layer. Therefore, the present invention cannot be inferred from Japanese Patent Application Laid-Open Hei 6 (1994)-76260. If the medium layer structure is different, then characteristics are totally different. Further, in Japanese Patent Application Laid-Open Hei 6 (1994)-76260, CoPtBO is used for a magnetic layer, and different from the invention, Cr is not contained. According to the result of the examination by the inventors, it is essential to add Cr in order to achieve high coercivity of the medium, and low noise. Therefore, this point is also different from the conventional art.

In order to achieve high coercivity of the medium and low noise, it is important that the magnetic recording layer mainly contains Co, and at least Cr by an amount of 15 at. % to 25 at. %, and Pt by an amount of 10 at. % to 20 at. %. In addition, when B, Ti, Nb and Ta are added to achieve low noise, it is important to set the total concentration of these elements equal to 8 at. % or lower to prevent the non-magnetization of the magnetic layer. In the magnetic layer composition, at least Co need be set equal to 62 at. % or more. If Co concentration drops below 62 at. %, a conspicuous reduction occurs in a residual magnetic flux density, reducing magnetic flux leaked from the medium, and consequently making it difficult to read a signal by the magnetic head.

Preferably, a non-magnetic h. c. p. intermediate layer containing at least Co and Cr, and having the added concentration of Cr set in the range from 28 at. % to 45 at. % should be provided between the non-magnetic f. c. c. intermediate layer of Cu or the like and the magnetic recording layer, in order to increase coercivity and squareness. The increase of squareness provides an effect for suppressing a reduction with time in read output caused by the influence of thermal fluctuation. The (111) of non-magnetic f. c. c. intermediate layer of Cu or the like, and the (00.1) of the magnetic recording layer are atom arrays having the same closest packing structures. However, because of difference in kind between f c. c. and h. c. p. crystal structures, slight disturbance occurs in heteroepitaxial growth in an interface thereof. Therefore, by providing a second non-magnetic intermediate layer having the same h. c. p. structure as that of the magnetic recording layer, the crystal orientation of the magnetic recording layer can be enhanced. When a non-magnetic intermediate layer containing Co and Cr is used, since the intermediate layer is non-magnetized maintaining the h. c. p. structure, the added concentration of Cr need be set in the range from 28 at. % to 45 at. %.

A layer thickness of the non-magnetic intermediate layer need be set in the range from 0.3 nm to 25 nm. In the case of the double-layered structure of the non-magnetic f c. c. intermediate layer of Cu or the like and the non-magnetic h. c. p. intermediate layer, a total layer thickness need be set within the above range. If a layer thickness is smaller than 0.3 nm, the intermediate layer itself cannot be formed as a stable crystal film. In addition, it is not preferable because of difficult production management or the like. On the other hand, if a layer thickness exceeds 25 nm, a spacing loss between the soft magnetic layer and the magnetic recording layer is increased, and a recording magnetic field becomes steep, making it impossible to narrow the width of a magnetization transition region formed in the medium. In other words, high-density recording cannot be realized. One of the significant points of providing the soft magnetic layer is to draw in and make steep a recording magnetic field, and in order to achieve the object of the invention, a total thickness of the intermediate layer need be set equal to 25 nm or lower.

The second object of the invention is achieved by a magnetic storage apparatus, comprising: a magnetic recording medium; a driver for driving the magnetic recording medium in a recording direction; a magnetic head composed of recording and reading units; means for moving the magnetic head in relative relation to the magnetic recording medium; and read/write signal processing means for subjecting an input signal to the magnetic head, alternatively an output signal from the same, to wave form processing. In this case, as the recording medium, the foregoing perpendicular magnetic recording medium of the above-described invention is used. By the magnetic storage apparatus of the invention, a recording density of 50 gigabits or more per 1 square inch can be achieved. As the perpendicular magnetic recording medium, according to the invention, a single-layered perpendicular medium having no soft magnetic layer can be used, and as the magnetic head, one including a recording unit composed of a ring head can be used. Alternatively, as the perpendicular magnetic recording medium, according to the invention, a double-layered perpendicular medium having a soft magnetic layer can be used, and as the magnetic head, one including a recording unit composed of a single magnetic pole head can be used. Preferably, the reading unit of the magnetic head should be composed of a magnetoresistive device.

DESCRIPTION OF THE PREFERRED EMBODIMENTS

Next, the preferred embodiments of the present invention will be described with reference to the accompanying drawings.

First Embodiment

Figure 1:
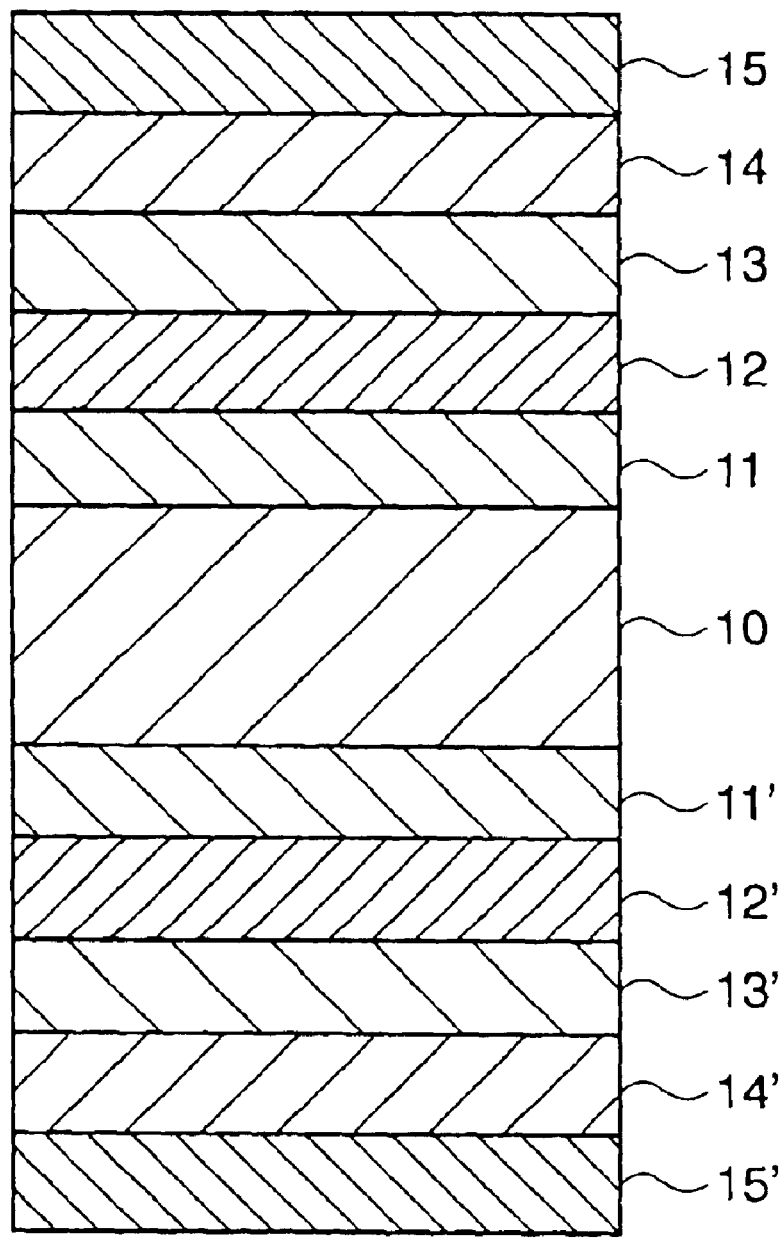
FIG. 1 is a sectional schematic view showing an example of a perpendicular magnetic recording medium according to the present invention.
Figure 2:
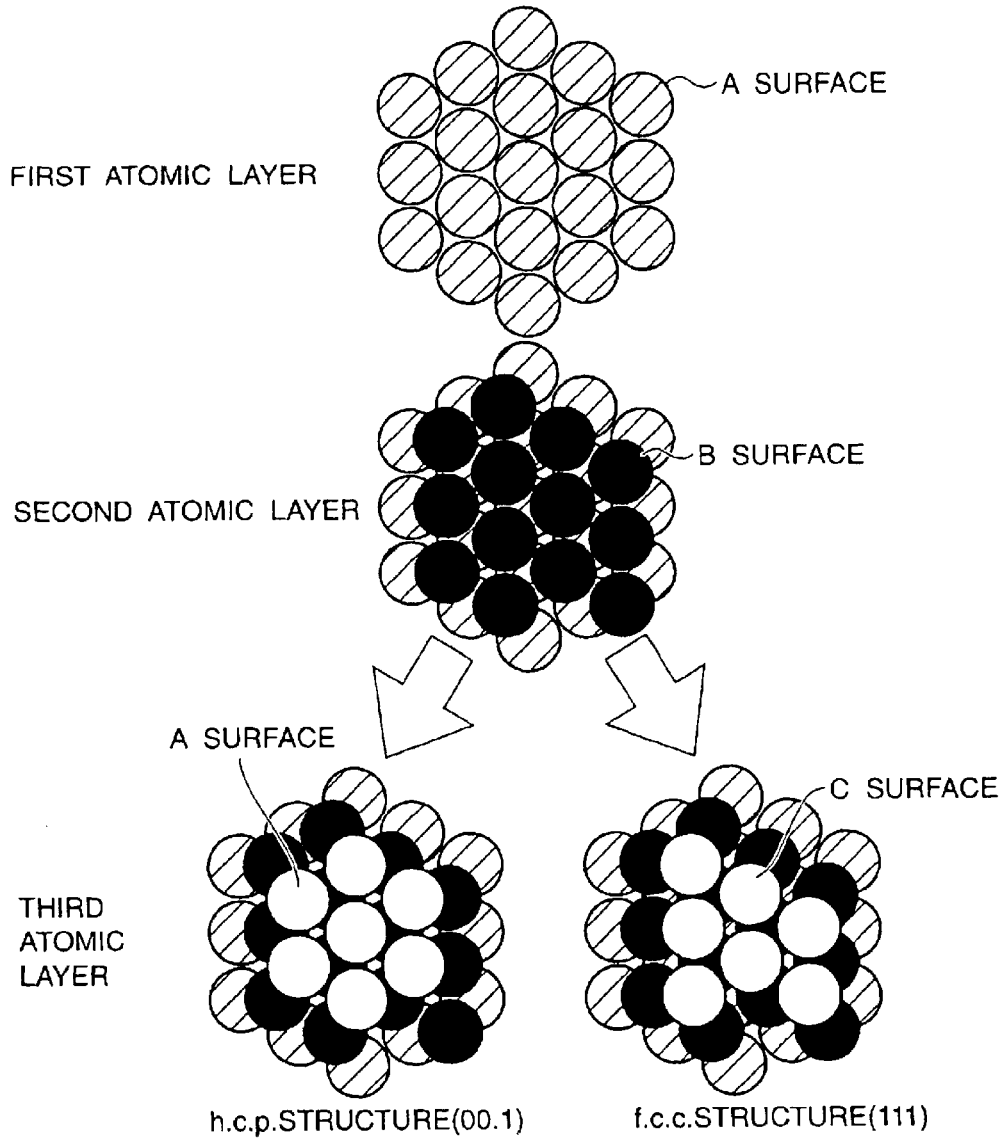
FIG. 2 is a view showing atom arrays in h. c. p. and f. c. c structures.
Figure 3:
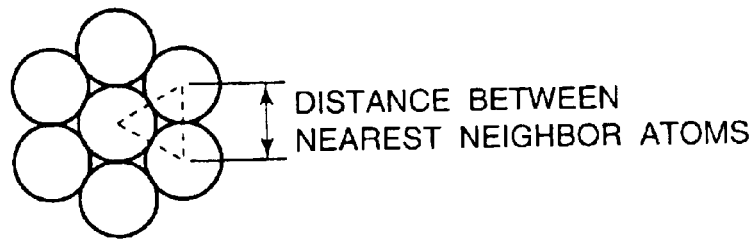
FIG. 3 is a view illustrating a distance between nearest neighbor atoms in a closest packing surface.
Figure 4:
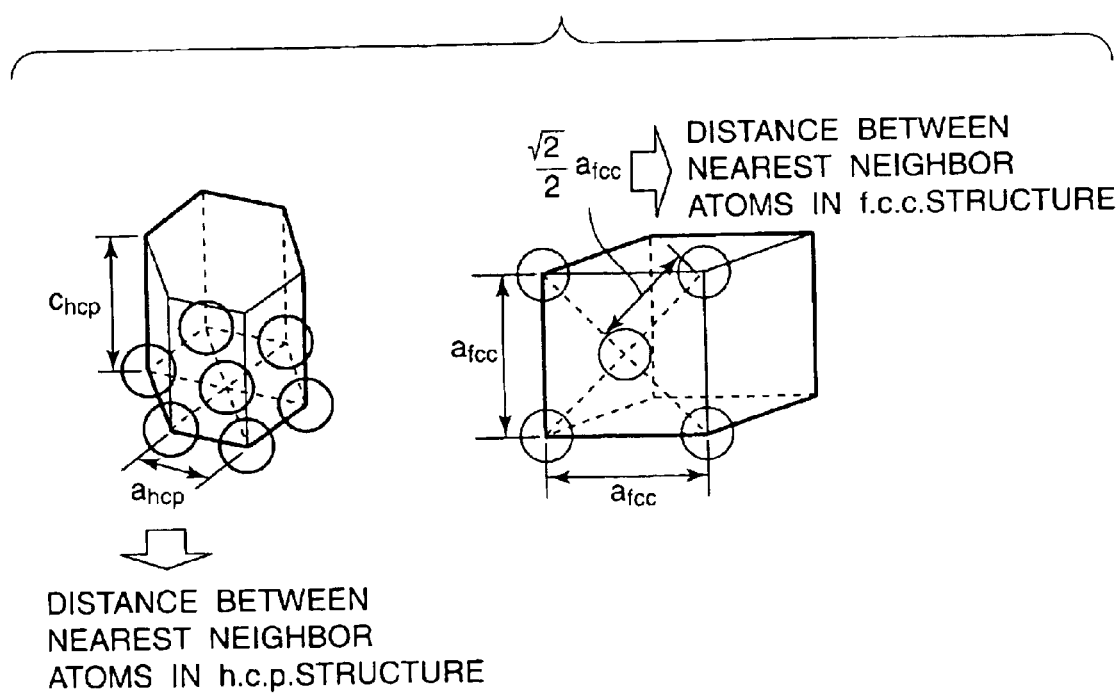
FIG. 4 is a view showing a distance between nearest neighbor atoms in the h. c. p. and f c. c. structures.

FIG. 1 is a sectional view of a magnetic recording medium according to the first embodiment of the invention. A basic layer structure of the magnetic recording medium of the embodiment is as follows. That is, Co-10 at. % Ta-2 at. % Zr soft magnetic layers 11 and 11' are formed by 200 nm on the glass substrate 10 of an outer diameter 65 mmφ. Then, Cu non-magnetic intermediate layers 12 and 12' are formed by 5 nm, and Co-40 at. % Cr non-magnetic layers 13 and 13' are provided by 15 nm. After forming Co-21 at. % Cr-14 at. % Pt-4at % B magnetic recording layers 14 and 14' by 25 nm, C protective layers 15 and 15' are lastly formed by 5 nm, and lubricant is applied. Here, to explain the method of describing each layer composition, a numeral before each element represents atomic concentration thereof. In the embodiment, all the layers were formed by DC magnetron sputtering. Basic sputtering conditions were, Ar gas pressure: 0.27Pa, and input power density: 39.5 kW/m².

As a comparison example 1, the same medium as that of the first embodiment except for no provision of Cu non-magnetic intermediate layers 12 and 12' of the above-described first embodiment was made.

Figure 5:
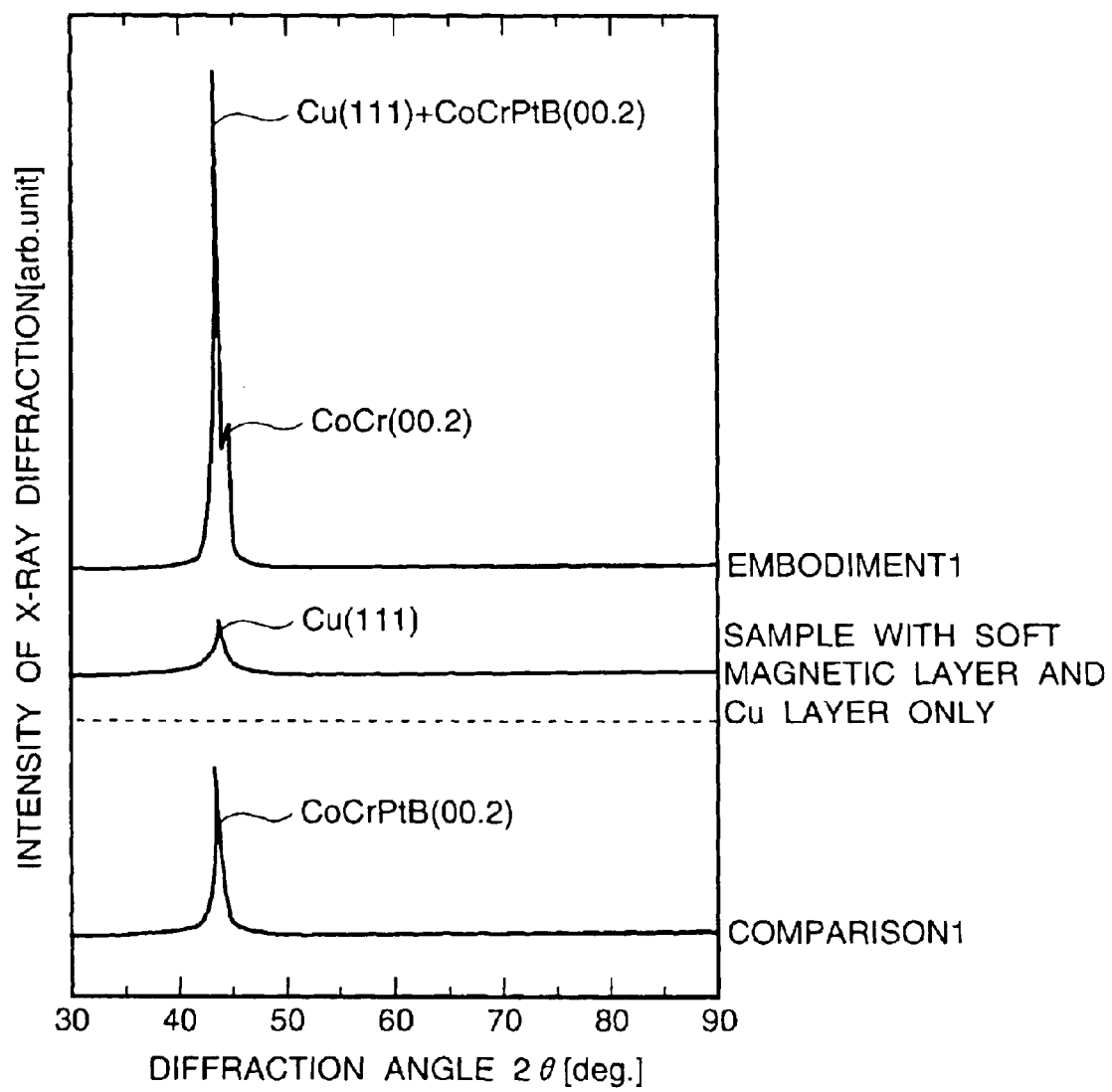
FIG. 5 is a view showing a difference in crystal orientation depending on presence of a Cu non-magnetic intermediate layer.

FIG. 5 shows the result of investigating crystal orientation carried out by using an X-ray diffraction method (θ-2θ) regarding the media respectively of the first embodiment and the comparison example 1. It can be understood that the medium of the first embodiment has a stronger (00.2) diffraction intensity of a CoCrPtB magnetic layer. However, since the peak position of CoCrPtB (00.2) was near that of Cu (111), a sample (with a soft magnetic layer and a Cu layer only) including a Co-10 at. % Ta-2 at. % Zr soft magnetic layer and a Cu non-magnetic intermediate layer formed respectively by 200 nm and 5 nm was made on the glass substrate, and comparison was made with this sample. It can be understood that even if Cu (111) intensity obtained from the sample with the soft magnetic layer and the Cu layer only is subtracted from the medium of the first embodiment, CoCrPtB (00.2) intensity is sufficiently strong compared with the comparison example 1. In addition, because of a narrow spacing of the CoCr intermediate layer, a peak appears at a higher angle side than Cu (111). In the first embodiment, the (00.2) peak of the CoCr intermediate layer is recognized, while no such peak is recognized in the comparison example 1. This means that the presence of the Cu intermediate layer has enhanced (00.2) orientation for the CoCr non-magnetic intermediate layer. The foregoing proves that the Cu (111) having the f c. c. structure enhances the (00.1) orientation of the CoCrPtB magnetic recording layer or the CoCr intermediate layer having the h. c. p. structure.

The embodiment has been described by way of example of using Cu as the non-magnetic intermediate layer. However, it was verified that even when Al, Rh, Pd, Ag, Ir and Au were used, the (00.1) orientation of the magnetic recording layer was enhanced as in the case of Cu.

Second Embodiment

The layer structure of a magnetic recording medium according to the embodiment 2-1 will be now described by referring to FIG. 1. Co-10 at. % Ta-2 at. % Zr soft magnetic layers 11 and 11' are formed by 200 nm on the glass substrate 10 having an outer diameter of 65 mmφ. Then, Cu non-magnetic intermediate layers 12 and 12' are formed by 10 nm, and Co-40 at. % Cr non-magnetic intermediate layers 13 and 13' are provided by 15 nm. After forming Co-19 at. % Cr-10 at. % Pt-5 at. % B magnetic layers 14 and 14' by 25 nm, C protective layers 15 and 15' are lastly formed, and lubricant is applied. As a medium of an embodiment 2-2, a medium having no Co-40 at. % Cr non-magnetic intermediate layer of the medium of the above-described embodiment 2-1 was made.

As a medium of a comparison example 2-1, the inventors made the same medium as that of the embodiment 2-1 except for the provision of a Ti-10 at. % Cr non-magnetic intermediate layer instead of the Cu non-magnetic intermediate layer of the medium of the above-described embodiment 2-1. Further, as a medium of a comparison example 2-2, a medium provided with a Pt non-magnetic intermediate layer instead of the Cu non-magnetic intermediate layer of the medium of the above-described embodiment 2-1 was made.

Table 2 shows coercivity and squareness measured by using a device utilizing Kerr effect, regarding the media respectively of the embodiments and the comparison examples.

TABLE 2

|  | Coercivity [kA/m] | Squareness |
|---|---|---|
| Embodiment 2-1 | 278.5 | 0.95 |
| Embodiment 2-2 | 262.6 | 0.90 |
| Comparison Example 2-1 | 230.8 | 0.78 |
| Comparison Example 2-2 | 206.9 | 0.82 |

To realize ultra-high density magnetic recording of 50 gigabits or more per 1 square inch, coercivity must be set equal to 238.7 kA/m or higher. In addition, to prevent a reduction in read output caused by the influence of thermal fluctuation, squareness must be set to at least 0.9 or higher. The embodiments 2-1 and 2-2 have coercivity and squareness satisfying the references. It was discovered, however, from comparison of the embodiments 2-1 and 2-2, that the medium of the embodiment 2-2 had characteristics slightly worse in coercivity and squareness than those of the medium of the embodiment 2-1, because of the absence of CoCr non-magnetic intermediate layer. On the other hand, the media of the comparison examples 2-1 and 2-2 have coercivity and squareness not satisfying the references. In the case of the comparison example 2-1 using the TiCr non-magnetic intermediate layer, perpendicular orientation somewhat satisfactory was obtained, and thus squareness was considerably smaller while coercivity was slightly smaller. In the comparison example 2-2 using the Pt non-magnetic intermediate layer, both the coercivity and squareness took low values, which may be attributed to the fact that though Pt (111) orientation was strong, an improvement on the perpendicular orientation of the magnetic recording layer was limited because of mismatching between the magnetic recording layer and the crystal lattice. Further, Pt is not preferable, because there is a problem of compatibility with the soft magnetic layer or the non-magnetic h. c. p. structure disposed on the upper and lower sides, and the Pt may be unstable when heat treatment or the like is performed.

Third Embodiment

Figure 6:
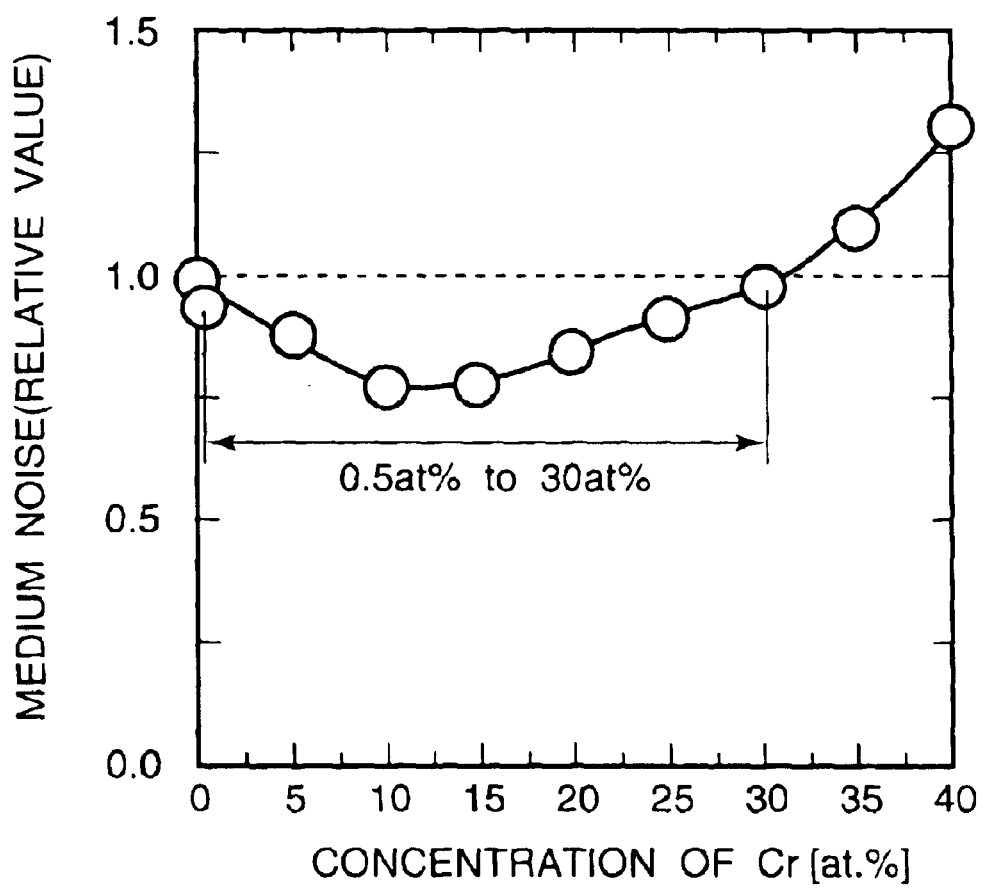
FIG. 6 is a view showing a change in medium noise when Cr concentration added to the Cu non-magnetic intermediate layer.

In the embodiment, examination was carried out regarding noise reduction by adding an element having a b. c. c. structure to a Cu non-magnetic intermediate layer. FIG. 6 shows a change in medium noise when Cr was added to the Cu non-magnetic intermediate layer by varying concentration in the medium of the structure of the first embodiment. For the measurement of medium noise, a signal was recorded at a recording density 500 kFCI by using the single magnetic pole head, and read back by a GMR head stably floated at a height of 40 nm or lower. In the graph of FIG. 6, the change of medium noise is shown as a change in relative relation to a sample having no Cr added at all set as 1.

In FIG. 6, in a region where Cr added concentration is set in the range from 0.5 at. % to 30 at. %, a phenomenon of a medium noise reduction is recognized. The setting of Cr concentration equal to 0.5 at. % or lower is not advantageous for micronizing the crystal grain size of the non-magnetic intermediate layer. On the other hand, in a region where Cr concentration exceeds 30 at. %, Cr is present as crystal particles having a b. c. c. structure in the non-magnetic intermediate layer, which may be understood to have disturbed the perpendicular orientation of the magnetic recording layer. Since the binary state diagram of the elements having the b. c. c. structure, such as Cu and Cr was a two-phase separation system, a large quantity of b. c. c. element addition resulted in the disturbed orientation of the magnetic recording layer.

Table 3 shows the result of investigation as to a change in medium noise by varying the kind of b. c. c. element. In this case, each concentration of added b. c. c. elements was maintained constant at 15 at. %. Though there was variance in the reduction effect of medium noise, it was verified that medium noise was reduced by the addition of any one of elements V, Cr, Nb, Mo, Ta and W. For the elements other than Cr, the optimal concentration of addition was substantially the same, i.e., in the range from 0.5 at. % to 30 at. %. To Cu, a plurality of elements having b. c. c. structures may be selected and added. In such a case, it is only necessary to set the total concentration of added elements selected from V, Cr, Nb, Mo, Ta and W in the range from 0.5 at. % to 30 at. %.

TABLE 3

| Element | Medium noise (relative value) |
|---|---|
| None | 1.00 |
| V | 0.82 |
| Cr | 0.78 |
| Nb | 0.75 |
| Mo | 0.80 |
| Ta | 0.82 |
| W | 0.85 |

Fourth Embodiment

In the embodiment, examination was carried out as to the layer thickness of the intermediate layer. The structure of a medium examined in the present embodiment will now be described by referring to FIG. 1. On the glass substrate 10 of an outer diameter 65 mmφ, Fe-8 at. % Ta-12 at. % C soft magnetic layers 11 and 11' are formed by 400 nm. Then, Cu-15 at. % Nb non-magnetic intermediate layers 12 and 12' are formed by changing a layer thickness, and Co-35 at. % Cr non-magnetic intermediate layers 13 and 13' are provided by 0 nm or 10 nm. After forming Co-21 at. % Cr-12 at. % Pt-2 at % Ta magnetic recording layers 14 and 14' by 25 nm, lastly C protective layers 15 and 15' are formed by 5 nm, and lubricant is applied.

Figure 7:
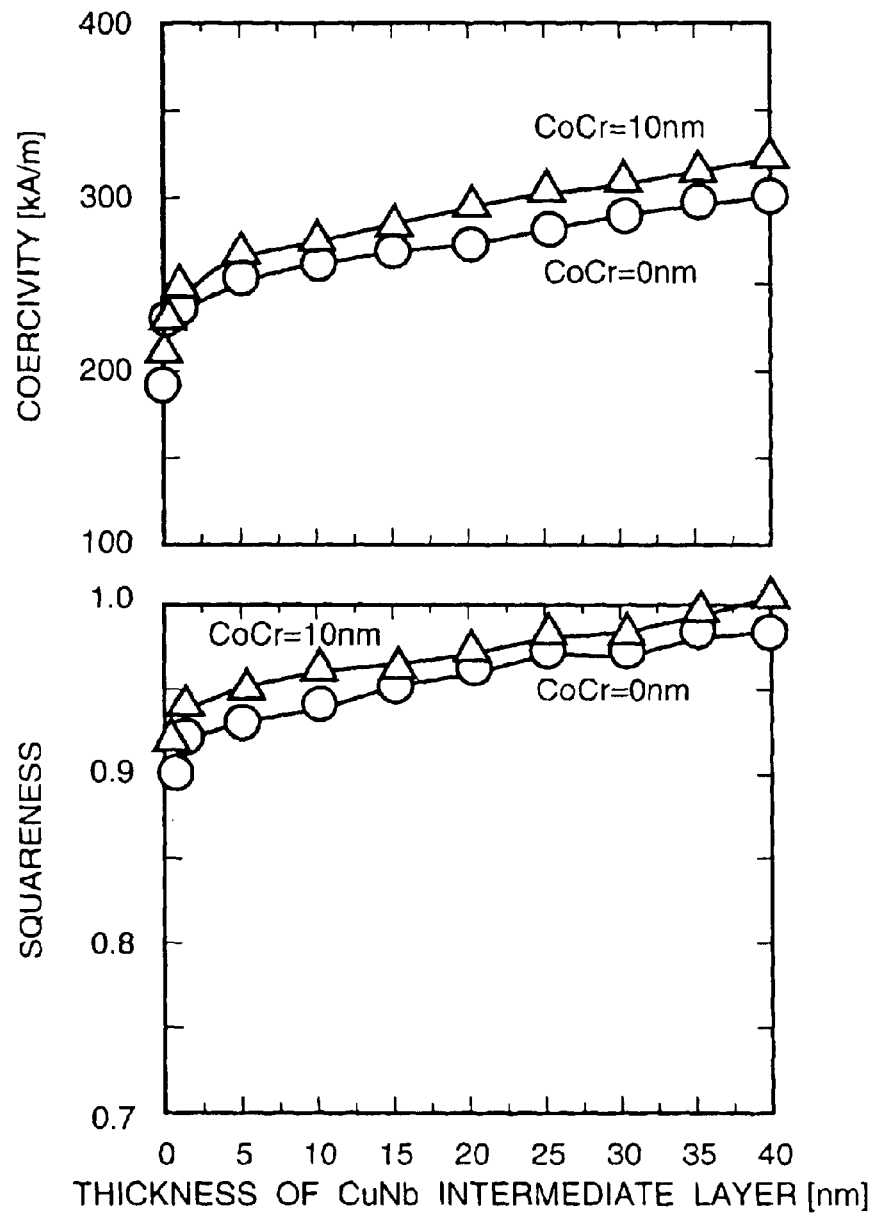
FIG. 7 is a view showing a change in coercivity and squareness when a layer thickness of the non-magnetic intermediate layer is changed.

As shown in FIG. 7, in any of the media having CoCr intermediate layers set to 0 nm and 10 nm in thickness, coercivity and squareness were increased with the increase of the layer thickness of the CuNb non-magnetic intermediate layer. From the viewpoint of a magnetic characteristic, it was discovered that a thickness of the intermediate layer should preferably be set equal to 0.3 nm or higher. The setting of a layer thickness below 0.3 nm is not preferable, because the electric discharging stability of sputtering and the crystallization of the intermediate layer are deteriorated. On the other hand, an upper limit of the layer thickness of the intermediate layer is set by a reduction in read output. Table 4 shows the result of representing the size of read output by a relative value when the layer thickness of the non-magnetic intermediate layer is changed, with read output set to 1 when the layer thickness of the CoCr intermediate layer is 0 nm, and the layer thickness of the CuNb intermediate layer is 0 nm. A signal was recorded at a recording density 500 kFCI by using the single magnetic pole head, and read back by the GMR head stably floated at a height of 40 nm or lower.

TABLE 4

| Thickness of CuNb Intermediate Layer [nm] | CoCr = 0 nm | CoCr = 10 nm |
|---|---|---|
| 0 | 1.0 (o) | 0.93 (o) |
| 0.3 | 1.0 (o) | 0.92 (o) |
| 1 | 0.99 (o) | 0.91 (o) |
| 5 | 0.97 (o) | 0.90 (o) |
| 10 | 0.93 (o) | 0.88 (o) |
| 15 | 0.90 (o) | 0.85 (o) |
| 20 | 0.88 (o) | 0.83 (x) |
| 25 | 0.85 (o) | 0.80 (x) |
| 30 | 0.82 (x) | 0.78 (x) |
| 35 | 0.79 (x) | 0.77 (x) |
| 40 | 0.77 (x) | 0.75 (x) |

A permissible reduction in read output is up to 0.85. A more reduction than this level is not preferable for signal processing carried out by the circuit of a rear stage. As can be understood from Table 4, permissible ranges are as follows: when the CoCr intermediate layer is 0 nm, the CuNb non-magnetic intermediate layer is up to 25 nm, and when the CoCr intermediate layer is 10 nm, the CuNb non-magnetic intermediate layer is up to 15 nm. In other words, the total layer thickness of the CoCr intermediate layer and the CuNb non-magnetic intermediate layer must be set equal to 25 nm or lower. This is attributed to the fact that the setting of a total thickness of the intermediate layer at over 25 nm causes a larger spacing loss between the soft magnetic layer and the magnetic recording layer, making it impossible to introduce a leakage magnetic flux from the soft magnetic layer to the magnetic head. In addition, the larger spacing loss between the soft magnetic layer and the magnetic recording layer makes a recording magnetic field steep, making it impossible to narrow the width of a magnetization transition region formed in the medium. Consequently, it is impossible to realize high-density recording.

Fifth Embodiment

Figure 8A:
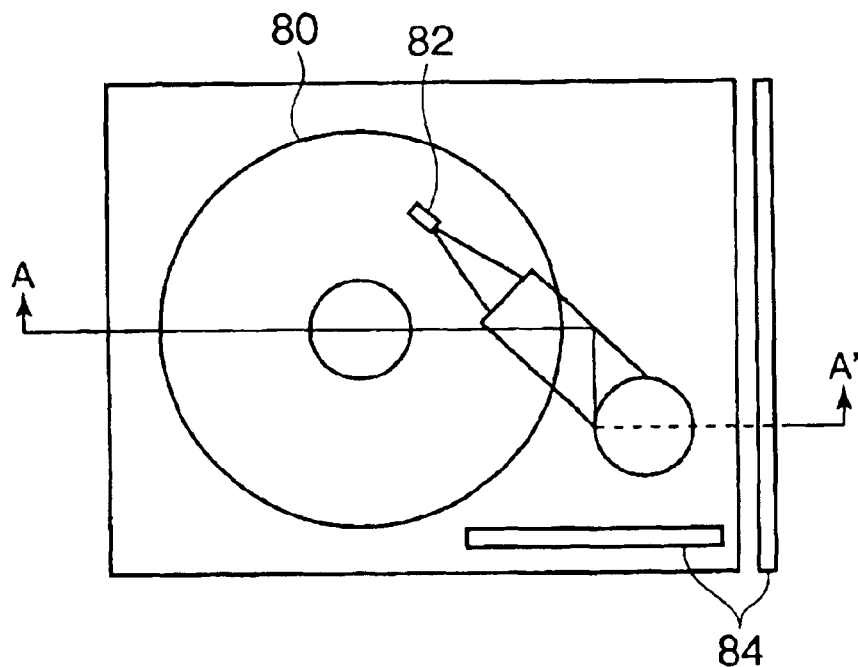
FIGS. 8(a) and 8(b) are schematic views, each thereof showing an example of a structure of a magnetic storage apparatus.
Figure 8B:
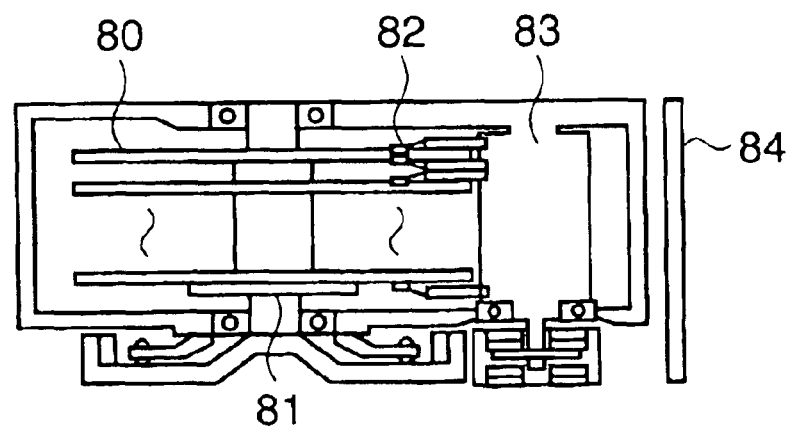

FIG. 8(a) is an upper surface view of an example of a magnetic storage apparatus using the perpendicular magnetic recording medium of the invention; and FIG. 8(b) is a sectional view taken on line A–A' of FIG. 8(a). A perpendicular magnetic recording medium 80 is held by a holding tool connected to a magnetic recording medium driver 81, and a magnetic head 82 is disposed oppositely to each surface of the perpendicular magnetic recording medium 80. The recording unit of the magnetic head 82 is composed of a single magnetic pole head, and the reading unit thereof is composed of a magnetoresistive effect device of GMR, TMR or the like. The magnetic head 82 is stably floated low at a height of 40 nm or lower, and driven to a desired track by a magnetic head driver 83 with head positioning accuracy of 0.5 µm or lower.

Figure 9:
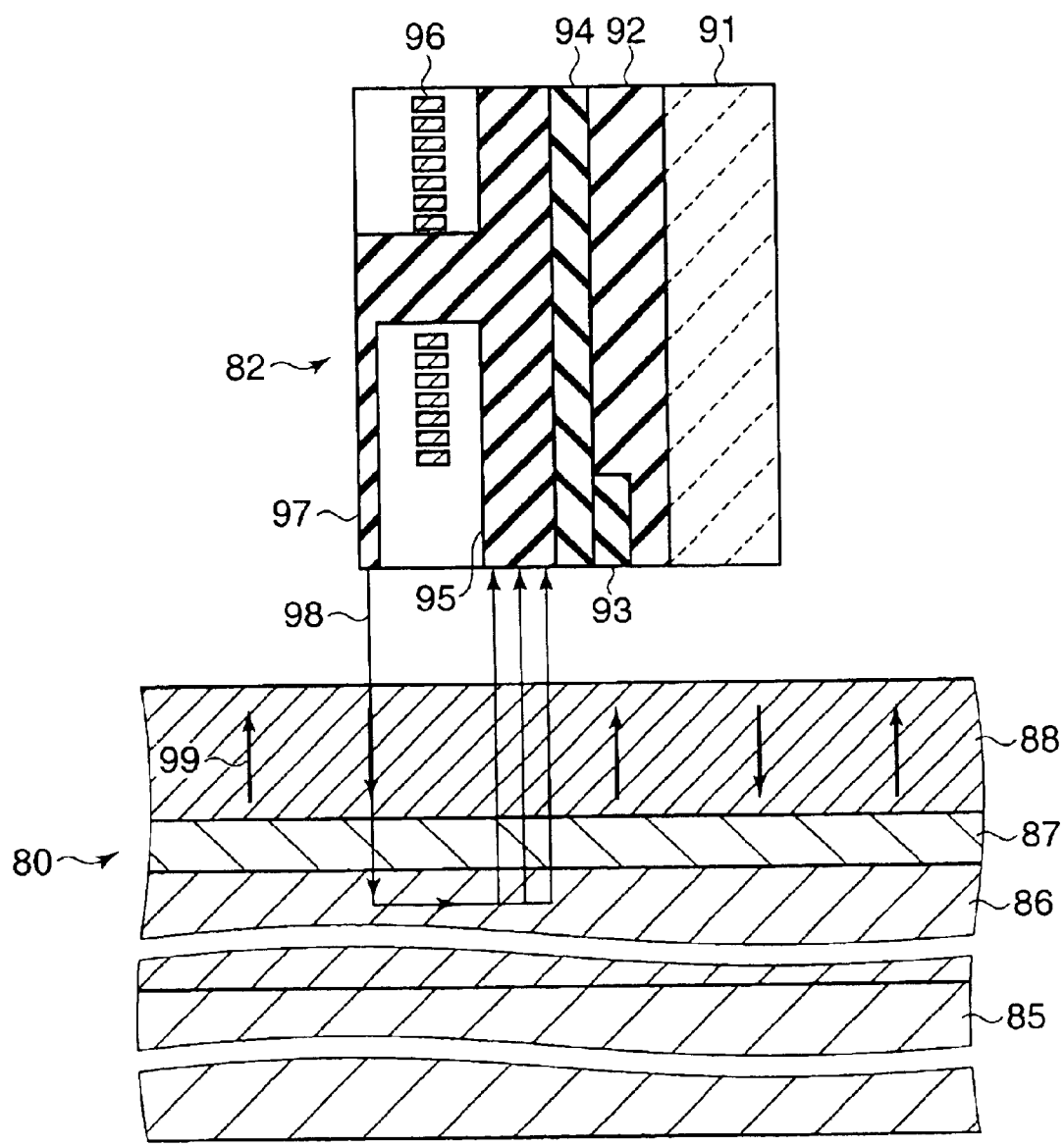
FIG. 9 is a schematic sectional view showing a situation of magnetic recording on the perpendicular magnetic recording medium by a single magnetic pole head.

FIG. 9 is a schematic sectional view showing the situation of magnetic recording in the perpendicular magnetic recording medium by the single magnetic pole head. The perpendicular magnetic recording medium 80 is a medium described above in the foregoing embodiment, which includes a soft magnetic layer 86, a non-magnetic intermediate layer 87 and a magnetic recording layer 88 formed on a substrate 85. The non-magnetic intermediate layer 87 may be a double-layered structure non-magnetic intermediate layer or a single-layered non-magnetic intermediate layer. In addition, the magnetic head 82 includes a reading unit constructed by lower and upper shield layers 92 and 94 sandwiching a magnetoresistive device 93, which are formed on a substrate 91, and a single magnetic pole head (recording unit) composed of a main pole 97, an auxiliary pole 95, and a coil 96.

During recording, a recording magnetic field 98 is generated from the main pole 97 of the single magnetic pole head toward the medium 80, and a magnetic flux thereof is retuned through the magnetic recording layer 88 of the perpendicular magnetic recording medium 80 and the soft magnetic layer 86 therebelow to the auxiliary pole 95. The single magnetic pole head is adapted to perform magnetic recording by sandwiching the magnetic recording layer 88 of the medium by the main pole 97 and the soft magnetic layer 86, and forming recorded magnetization 99 in the magnetic recording layer 88 by a magnetic flux directed from the main pole 97 to the soft magnetic layer 86.

Different from the ring head adapted to perform recording by using a perpendicular element of a magnetic flux fed back from the upper pole to the lower pole, the single magnetic pole head can generate a magnetic flux including only a perpendicular element. Thus, the single magnetic pole head provides a stronger recording magnetic field of a perpendicular direction than the ring head. The auxiliary pole 95 for the return of a magnetic flux is provided, since the generated magnetic flux must always be fed back somewhere. However, recording is not performed by a magnetic flux returned from the soft magnetic layer 86 to the auxiliary pole 95. A reason therefor is that since an area of the auxiliary pole 95 attracting a magnetic flux is larger than that of the main pole 97, from which a magnetic flux flows out, the intensity (magnetic flux density) of the magnetic field of a magnetic flux returned from the soft magnetic layer 86 to the auxiliary pole 96 is smaller than that of a magnetic flux flowing from the main pole 97 to the soft magnetic layer 86, and no magnetization reversal occurs in the magnetic recording layer 88 by the magnetic field returned to the auxiliary pole 95.

A signal read back by the magnetoresistive device 93 of the magnetic head 82 is subjected to wave form processing by a read/write signal processing system 84. The read/write signal processing system 84 includes an amplifier, an analog equalizer, an AD converter, a digital equalizer, a maximum likelihood signal processor, and so on. A read-back wave form of the head using a magnetoresistive effect may be asymmetrical between positive and negative sizes depending on a head characteristic, and affected by the frequency characteristic of the read/write system, causing a signal to be mistakenly read to be different from a recorded signal. The analog equalizer has a function of adjusting and rectifying a read-back wave form. The rectified wave form is subjected to digital conversion by the AD converter, and the wave form is further adjusted by the digital equalizer. Lastly, the rectified signal is demodulated to most assured data by the maximum likelihood signal processing. By the read signal processing system having the foregoing configuration, signal reading/writing is performed at an extremely low error rate. For the equalizer and the maximum likelihood signal processing, those available in the conventional art may be used.

The foregoing apparatus configuration enables a high-density magnetic storage apparatus to be realized, which can provide a recording density of 50 gigabits or more per 1 square inch, and a storage capacity three times larger than that of the conventional magnetic storage apparatus.

Moreover, the inventors manufactured a magnetic storage apparatus combining the single-layered perpendicular magnetic recording medium of the invention and a ring head. The structure of this magnetic storage apparatus is the same as that of FIG. 8 except for the fact that the perpendicular magnetic recording medium has no soft magnetic layer, and the ring head is used as the recording unit of a magnetic head.

Figure 10:
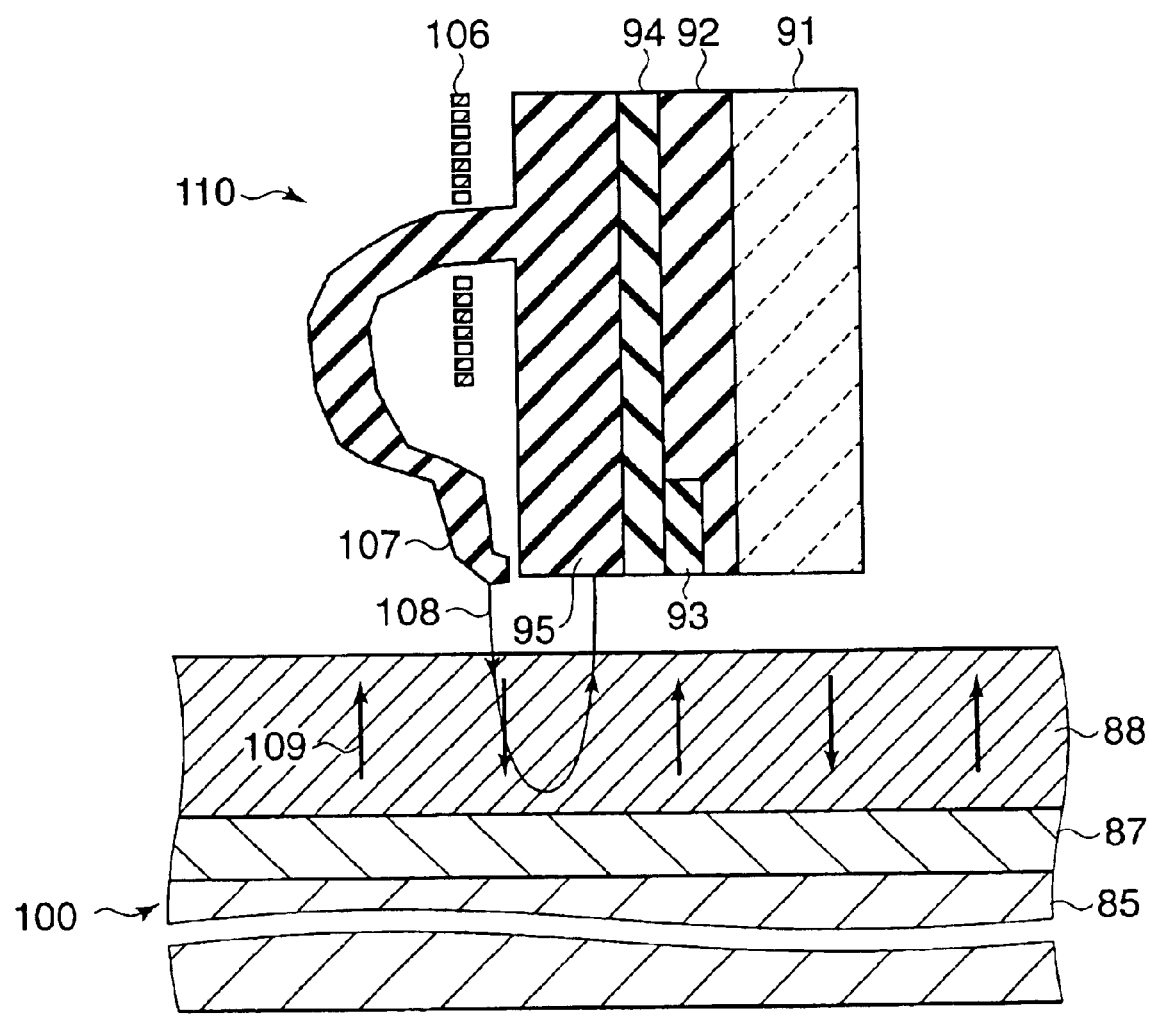
FIG. 10 is a schematic sectional view showing a situation of magnetic recording on the perpendicular magnetic recording medium by a ring head.

FIG. 10 is a schematic sectional view showing the situation of magnetic recording in the perpendicular magnetic recording medium by the ring head. A perpendicular magnetic recording medium 100 includes a non-magnetic intermediate layer 87 and a magnetic recording layer 88 formed on a substrate 85. Except for the absence of soft magnetic layer, the deposition method, the materials and the layer thickness, and so on, of the non-magnetic intermediate layer 87 and the magnetic recording layer 88 are the same as those of the medium described above in the foregoing embodiment. The non-magnetic intermediate layer 87 may be a double-layered non-magnetic intermediate layer or a single-layered non-magnetic intermediate layer. A magnetic head 110 includes a reading unit constructed by sandwiching a magnetoresistive device 93 with lower and upper shield layers 92 and 94 formed on a substrate 91, and a ring head (recording unit) composed of upper and lower poles 107 and 105 and a coil 106. The ring head performs perpendicular recording by using the perpendicular element of a recording magnetic field 108 fed back from the upper pole 107 to the lower pole 105 to form recorded magnetization 109 in the magnetic recording layer 88. Thus, only a weak recording magnetic field is obtained compared with the single magnetic pole head. However, since there is no need to use a double-layered medium, a problem of noise caused by the soft magnetic layer can be prevented.

A signal read back by the magnetoresistive device 93 of the magnetic head 82 was, as in the foregoing case, subjected to wave form processing by the read/write signal processing system 84. Such apparatus configuration enabled a recording density to be set equal to 50 gigabits or more per 1 square inch. However, an S/N ratio was slightly lower compared with that of the apparatus configuration using the single magnetic pole head.

The above-described embodiment has been described by way of example of the disk magnetic recording medium and the magnetic storage apparatus using the same. Needless to say, however, the present invention can be applied to a tape or card magnetic recording medium having a magnetic recording layer only in one side, and a magnetic storage apparatus using such a magnetic recording medium.

Moreover, for the manufacturing method of the magnetic recording medium, not only the DC magnetron sputtering method, but also an ECR sputtering method, an ion beam sputtering method, a vacuum evaporate method, a plasma CVD method, a coating method, a plating method, and any other methods can be used.

Another aspect of the present invention, a perpendicular magnetic recording medium, includes: a soft magnetic layer; a first non-magnetic intermediate layer mainly containing Cu; and a magnetic recording layer formed on said first intermediate layer, containing at least Co, Cr and Pt, and having a hexagonal close-packed structure.

A magnetic storage apparatus according to the present invention, includes: a perpendicular magnetic recording medium including a first intermediate layer having a face-centered cubic structure and containing non-magnetic elements excluding Pt, and a magnetic recording layer formed on the first intermediate layer, containing at least Co, Cr and Pt, and having a hexagonal close-packed structure; a driver for driving said perpendicular magnetic recording medium; a magnetic head including a reading unit and a recording unit having a ring head; means for moving said magnetic head in relative relation to said perpendicular magnetic recording medium; and signal processing means for subjecting an input signal to said magnetic head, alternatively an output signal from said magnetic head, to wave form processing.

A magnetic storage apparatus according to the present invention, includes: a perpendicular magnetic recording medium including a soft magnetic layer, a first intermediate layer formed on the soft magnetic layer, having a face-centered cubic structure and containing non-magnetic elements excluding Pt, and a magnetic recording layer formed on the first intermediate layer, containing at least Co, Cr and Pt, and having a hexagonal close-packed structure; a driver for driving said perpendicular magnetic recording medium; a magnetic head including a reading unit and a recording unit having a single magnetic pole head; means for moving said magnetic head in relative relation to said perpendicular magnetic recording medium; and signal processing means for subjecting an input signal to said magnetic head, alternatively an output signal from said magnetic head, to wave form processing.

A magnetic storage apparatus according to the present invention, includes: a perpendicular magnetic recording medium including a soft magnetic layer, a first intermediate layer formed on said soft magnetic layer, having a face-centered cubic structure, and containing non-magnetic elements excluding Pt, a second non-magnetic intermediate layer formed on said first intermediate layer and having a hexagonal close-packed structure, and a magnetic recording layer formed on said second intermediate layer, containing at least Co, Cr and Pt, and having a hexagonal close-packed structure; a driver for driving said perpendicular magnetic recording medium; a magnetic head including a reading unit and a recording unit having a single magnetic pole head; means for moving said magnetic head in relative relation to said perpendicular magnetic recording medium; and signal processing means for subjecting an input signal to said magnetic head, alternatively an output signal from said magnetic head, to wave form processing.

According to the invention, by forming the magnetic recording layer on the non-magnetic intermediate layer having the face-centered structure, it is possible to realize a medium having high coercivity, low noise and only a limited influence of thermal fluctuation. Further, by providing the non-magnetic h. c. p. intermediate layer between the non-magnetic intermediate layer and the magnetic recording layer, it is possible to enhance the perpendicular orientation of the magnetic recording layer more. By combining this perpendicular magnetic recording medium with the magnetic head which has a reading only device utilizing a magnetoresistive effect and including a recording unit composed of a single magnetic pole head and a reading unit composed of the magnetoresistive device such as GMR and TMR, it is also possible to provide a magnetic storage apparatus having a recording density set equal to 50 gigabits or more per 1 square inch.

What is claimed:

1. A perpendicular magnetic recording medium, comprising:
   a substrate;
   a soft magnetic layer;
   a first intermediate layer having a face-centered cubic structure and containing non-magnetic elements excluding Pt, wherein the first intermediate layer is formed on the soft magnetic layer;
   a second intermediate layer having a hexagonal close-packed structure being provided above the first intermediate layer and containing non-magnetic elements; and
   a magnetic recording layer formed above the second intermediate layer, containing at least Co, Cr and Pt,
   wherein the first intermediate layer and the second intermediate layer is 0.3–25 nm thick in total.

2. The perpendicular magnetic recording medium according to claim 1, wherein the soft magnetic layer is formed on the substrate.

3. The perpendicular magnetic recording medium according to claim 1, wherein the magnetic recording layer has a hexagonal close-packed structure.

4. The perpendicular magnetic recording medium according to claim 1, wherein the first intermediate layer mainly contains at least one selected from the group of elements constituted of Al, Cu, Rh, Pd, Ag, Ir and Au.

5. The perpendicular magnetic recording medium according to claim 1, wherein the first intermediate layer is (111) oriented.

6. The perpendicular magnetic recording medium according to claim 1, wherein the second intermediate layer mainly containing Co, to which a content of Cr set in a range from 28 at % to 45 at % is added.

7. The perpendicular magnetic recording medium according to claim 1, wherein the first intermediate layer mainly contains Cu, and at least one selected from the group of elements constituted of V, Cr, Nb, Mo, Ta and W.

8. The perpendicular magnetic recording medium according to claim 7, wherein a content of each of the V, Cr, Nb, Mo, Ta and W is set in a range from 0.5 at % to 30 at %, with respect to all elements constituting the first intermediate layer.

9. A magnetic recording and reproducing apparatus having a perpendicular magnetic recording medium comprising:
   a substrate;
   a soft magnetic layer;
   a first intermediate layer having a face-centered cubic structure and containing non-magnetic elements excluding Pt, wherein the first intermediate layer is formed on the soft magnetic layer;
   a second intermediate layer having a hexagonal close-packed structure provided above the first intermediate layer and containing non-magnetic elements; and
   a magnetic recording layer formed above the second intermediate layer, containing at least Co, Cr and Pt,
   wherein the first intermediate layer and the second intermediate layer is 0.3–25 nm thick in total.

10. The magnetic recording and reproducing apparatus according to claim 9, wherein the soft magnetic layer is formed on the substrate.

11. The magnetic recording and reproducing apparatus according to claim 9, wherein the magnetic recording layer has a hexagonal close-packed structure.

12. The magnetic recording and reproducing apparatus according to claim 9, wherein the first intermediate layer mainly contains at least one selected from the group of elements constituted of Al, Cu, Rh, Pd, Ag, Ir and Au.

13. The magnetic recording and reproducing apparatus according to claim 9, wherein the first intermediate layer is (111) oriented.

14. The magnetic recording and reproducing apparatus according to claim 9, wherein the second intermediate layer mainly containing Co, to which a content of Cr set in a range from 28 at % to 45 at % is added.

15. The magnetic recording and reproducing apparatus according to claim 9, wherein the first intermediate layer mainly contains Cu, and at least one selected from the group of elements constituted of V, Cr, Nb, Mo, Ta and W.

16. The magnetic recording and reproducing apparatus according to claim 15, wherein a content of each of the V, Cr, Nb, Mo, Ta and W is set in a range from 0.5 at % to 30 at %, with respect to all elements constituting the first intermediate layer.

* * * * *